Aug. 3, 1937.  M. G. WILSON  2,088,677
TRACTOR WHEEL
Filed Jan. 24, 1936
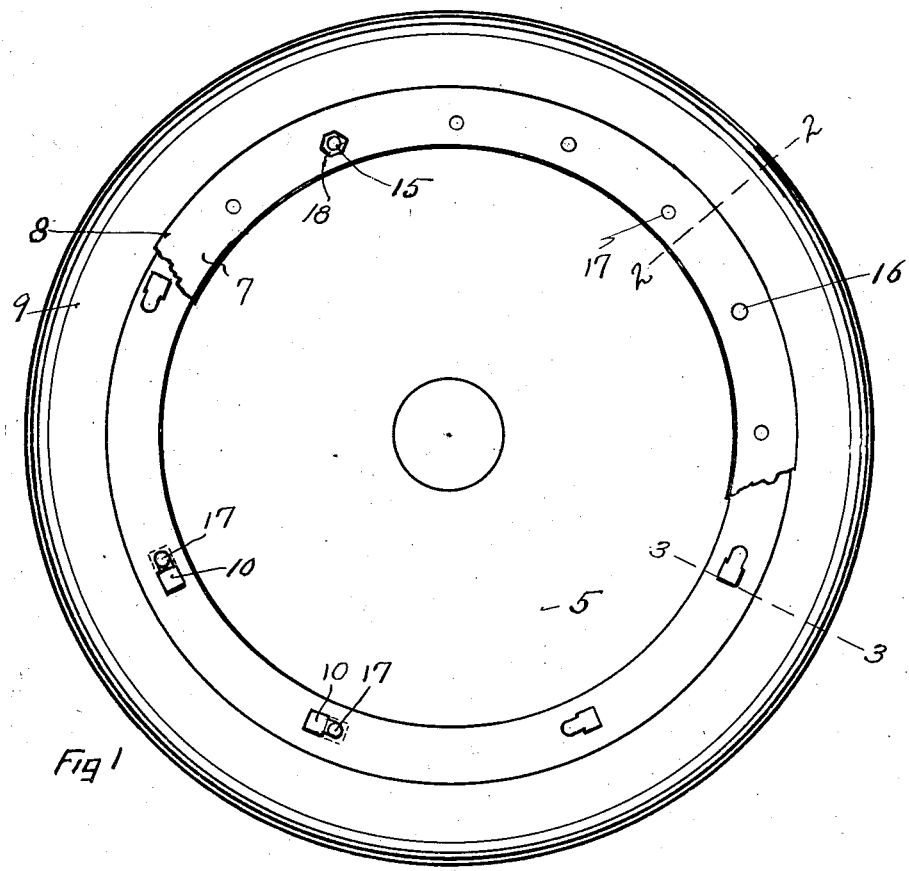
Fig 1
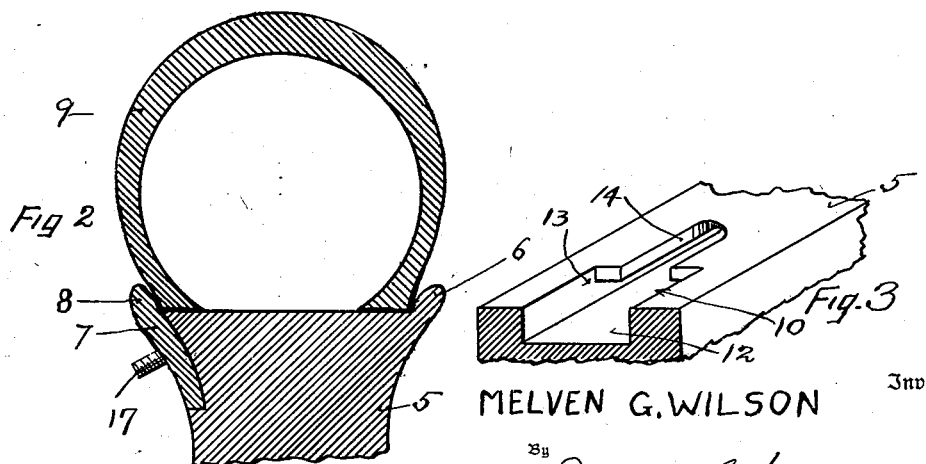
Fig 2
Fig. 3
MELVEN G. WILSON  Inventor
By Francis C. Huebner, Attorney Patented Aug. 3, 1937

2,088,677

UNITED STATES PATENT OFFICE 2,088,677

TRACTOR WHEEL

Melven G. Wilson, Fresno, Calif.

Application January 24, 1936, Serial No. 60,648

2 Claims. (Cl. 152—21)

My invention relates to a tractor wheel, and more specifically to that type of tractor wheel adapted to use pneumatic, or air cushioned tires.

An object of my invention is the construction of the wheel in separate parts so that one of the flanges can be removed, thus permitting the easy removal and replacement of the tires on the wheel. These parts are attached together with bolts which when broken or damaged can be easily removed and replaced, and the novel arrangement of the device prevents slippage of the parts relative to each other even when the bolts may become loose. These objects are novel especially in the heavy type of wheels now being constructed for tractors using air cushion tires. Other objects will be hereinafter disclosed.

These objects are accomplished by means of the device hereinafter described, and illustrated on the accompanying drawing in which Fig. 1 is a side view of a wheel having parts cut away for the purpose of showing the novel arrangement of the bolts for attaching the ring which comprises a part of the wheel. Fig. 2 is an enlarged sectional view of the wheel along sectional line 2—2 in Fig. 1. Fig. 3 is an enlarged perspective sectional view of a portion of the skeleton wheel along sectional lines 3—3 in Fig. 1.

Referring to the drawing, I have shown a solid cast skeleton wheel 5 which is bored at the center thereof to receive any of a plurality of hubs which fit various tractors, the hub not being shown or claimed herein. The periphery of the skeleton wheel is provided with an annular integral flange 6, and an independent ring 7 which, when assembled with the skeleton wheel forms flange 8 on the side of the wheel opposite to flange 6. These flanges are adapted to hold an air cushion tire 9 to the wheel. Ring 7 is attached to the skeleton wheel 5 by means of bolts 15. Square head bolts are preferably used, although bolts with square shanks, or other forms may be used with slight modification. For this purpose recesses 10 are formed in the skeleton wheel. This recess comprises a rectangular compartment 12 which is large enough to receive the head of bolt 15, and to permit the head of the bolt to slide therein. The portion of the recess above said compartment comprises an opening 13 large enough to permit the head of the bolt to enter compartment 12. Joining opening 13 is a reduced opening or slot 14 which is adapted to receive the stem of the bolt and to hold the head of the bolt in the chamber under said slot. These recesses are formed so that a bolt with a square head can be interlocked from turning when within compartment 12. The reduced opening, or slot 14, is of such width that when the shank of the bolt is square, such shank will interlock within the slot so the bolt cannot turn. When a bolt is provided with a square shank, the head of such bolt may be round or square. If a bolt in use on the wheel described should be broken or otherwise damaged, the damaged bolt could be easily removed from the recess and a new bolt installed.

It is also noted that such recesses are arranged in an annular line so the bolts when assembled in the recesses are adapted to cooperate with holes 16 in ring 7, so said ring can be bolted to the skeleton wheel 5. The recesses 10 are arranged so that the slotted portions of the recesses alternately face in opposite directions in the annular line on which they are located. This arrangement is desired so when ring 7 is assembled with the skeleton wheel it will be impossible for the bolts engaged in the slotted portion of the recesses to slip out of such positions, even though the nuts on such bolts should become loose. It is also obvious that it would be impossible to assemble ring 7 with the wheel unless all of the bolts are engaged in the slots.

The nut adapted to cooperate with bolt 15 is designated 18.

Having described my invention I claim:

1. On a tractor wheel adapted to use air pressure tires, a base or skeleton wheel having an annular flange on one side thereof, a ring adapted to be attached to the skeleton wheel concentric therewith, and on the side of the skeleton wheel opposite to the flange, said ring when assembled with the skeleton wheel being adapted to form an auxiliary flange, said ring being attached to the skeleton wheel with bolts passing through the ring, the skeleton wheel having bolt retainers consisting of recesses adapted to hold the heads of said bolts, said recesses being arranged concentric with the wheel, each recess comprising a rectangular chamber adapted for the head of the bolt to slide therein, one end of said chamber having an opening adapted to receive the head of the bolt, said opening terminating at the other end of the chamber with a reduced opening or slot of such size as to permit the stem of the bolt to slide therein and to retain the head of the bolt, said recesses being arranged so that the slotted portions in alternate recesses are reversed.

2. On a tractor wheel adapted for air pressure tires to be used thereon, a base wheel having an annular flange on one side thereof, a ring adapted to be attached to said base wheel on the side opposite to the integral annular flange, which is adapted when assembled with the base wheel to form an annular flange, said ring being attached to the base wheel with bolts, said bolts being anchored in the base wheel by means consisting of a plurality of recesses in the base wheel, arranged concentric with said wheel, each recess comprising a chamber adapted for the head of a bolt to slide therein, an entrance to said chamber of sufficient size for the head of the bolt to pass therethrough, a slot joining said entrance and extending therefrom, said slot being of sufficient size to receive the stem of the bolt but not to receive the head of the bolt, said recesses being arranged so that alternate slots face each other, the ring having a plurality of holes adapted to receive the bolts only when positioned in said slots.

MELVEN G. WILSON.